United States Patent Office 3,284,453
Patented Nov. 8, 1966

3,284,453
4-(2-AROYLETHYL)-1-PIPERAZINECARBOXYLIC ACID ESTERS
Andrew Stephen Tomcufcik, Old Tappan, N.J., Joyce Margaret Craig, Greenwich, Conn., and Stuart Dwight Willson, Park Ridge, N.J., assignors to American Cyanamid Company, Stamford, Conn., a corporation of Maine
No Drawing. Filed Sept. 29, 1964, Ser. No. 400,248
19 Claims. (Cl. 260—268)

This invention relates to new compounds which are esters of 4-(2-substituted carbonyl ethyl)-1-piperazinecarboxylic acids. More specifically, the invention relates to esters of 4-(2-aroylethyl)-1-piperazinecarboxylic acid of the formula:

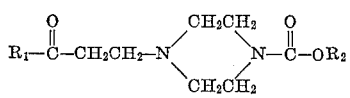

wherein $R_1$ is lower alkyl phenyl, hydroxy phenyl, lower alkoxy phenyl, halophenyl, nitrophenyl, aminophenyl, acylaminophenyl or trifluoromethylphenyl, naphthyl, phenanthryl, biphenylyl, thienyl, pyridyl, or furyl, $R_2$ is lower or phenyl(lower)alkyl.

The compounds of this invention are basic and form water stable acid addition salts. The free bases are, in general, liquids or low melting solids, insoluble in water, and soluble in common organic solvents such as benzene, toluene, lower alkyl ethers, lower alkanols, acetone, ethyl acetate, and the like. Acid addition salts such as hydrochlorides, hydrobromides, sulfates, phosphates, acetates, tartrates, citrates, cinnamates, lactates, meconates, mucates, etc. are soluble in water and, more or less, in lower alkanols, but generally insoluble in petroleum ethers, ethers, benzene, toluene, xylenes, chloroform, methylene chloride, and the like.

The compounds of this invention may be prepared by reacting a 1-substituted piperazine with an appropriate compound of the formula

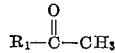

and formaldehyde, by the process described by Winstein, S., et al., J. Org. Chem. 11,218 (1946).

The above reaction can be illustrated as follows:

$$R_1-\overset{O}{\overset{\|}{C}}-CH_3 + HCHO + H-N\begin{array}{c}CH_2CH_2\\ \diagup \quad \diagdown \\ \diagdown \quad \diagup\\ CH_2CH_2\end{array}N-\overset{O}{\overset{\|}{C}}-OR_2 \longrightarrow$$

$$R_1-\overset{O}{\overset{\|}{C}}-CH_2CH_2-N\begin{array}{c}CH_2CH_2\\ \diagup \quad \diagdown \\ \diagdown \quad \diagup\\ CH_2CH_2\end{array}N-\overset{O}{\overset{\|}{C}}-OR_2$$

wherein $R_1$ and $R_2$ are as hereinafter defined.

The reaction is conveniently carried out within a temperature range of from about 75° C. to about 125° C. by stirring a refluxing solution of a salt of the 1-substituted piperazine, the acetyl compound, and 37% aqueous formaldehyde in the approximate molecular ratios 1:1.1:1.14 in a solvent such as lower alkanol for 30 minutes to eight hours, and thereafter cooling the reaction mixture to about 0 to −10° C., causing the product, in salt form, to crystallize from solution. It is generally advantageous to add additional formaldehyde solution during the course of the refluxing reaction for higher yields. The products, as salts, are conveniently recrystallized from lower alkanols, most conveniently absolute ethanol.

The preparation of the compounds of this invention can also be carried out by the following reaction sequence:

$$R_1-\overset{O}{\overset{\|}{C}}-CH_2CH_2-Cl + HN\diagdown\diagup N-\overset{O}{\overset{\|}{C}}-OR_2 \longrightarrow$$

$$R_1-\overset{O}{\overset{\|}{C}}-CH_2CH_2-N\diagdown\diagup N-COOC_2H_5$$

wherein $R_1$ and $R_2$ are as defined above. The reactions are carried out most conveniently in lower alkanols at about 75° C. to 125° C. for periods of two to eight hours, in the presence of alkaline bicarbonates and carbonates, for example, as acid binders. Removal of the inorganic residue and the solvent leaves the desired compound as the free base which can then be converted to a stable acid addition salt by methods well known in the art.

The compounds of this invention have shown unusually high activities against a variety of yeasts, fungi, and parasites in standard in vitro measurements. The present compounds are therefore useful as antifungal agents, amebicides and trichomonicides. The following tabulation (Table I) indicates the minimal inhibitory concentrations in micrograms per milliliter of compounds of the invention assayed against a variety of fungi:

TABLE I.—MINIMAL INHIBITORY CONCENTRATIONS IN MICROGRAMS PER MILLILITER OF MEDIUM

| | Candida Albicans Bergen Strain E-3 | Candida mycocarma ATCC 9888 | Saccharomyces cerevisiae ATCC 4100 | Mucor remannianus M-143 | Fusarium episphaeria P-106 | Hormodendrum cladosporoides Z-516 | Trichophyton Mentagrophytes E-11 | Microsporum gypseum E-28 | Penicillium digitatum P-308B | Memnoniella eschinata Z-583 | Chaetomium globosum ZMC-6694 (H-71) | Aspergillus fumigatus S-246 |
|---|---|---|---|---|---|---|---|---|---|---|---|---|
| Ethyl 4-(2-p-chlorobenzoylethyl)-1-piperazinecarboxylate hydrochloride | 16p 31 | 8 | 16 | | 16 | 62 | 2 | 4p 8 | 62 | 31 | 4p 8 | K |
| Ethyl 4-(2-p-anisoylethyl)-1-piperazinecarboxylate hydrochloride | 16p 31 | 4 | 16 | 62p 125 | 16p 31 | 62 | 0.5p 1 | 1p 4 | 31 | 31 | 2p 4 | |
| Ethyl 4-(2-p-ethoxybenzoyl)-1-piperazinecarboxylate hydrochloride | 31 | 16p 31 | 31 | 62p 125 | 31 | 62 | 0.25p 1 | 0.5p 2 | 62 | 62 | 4 | 250 |
| Ethyl 4-[2-(4-biphenylylcarbonyl)ethyl]-1-piperazinecarboxylate hydrochloride | 16 | 16 | 16 | 250 | 4 | 31 | 0.5p 1 | 12 | 31 | 8p 16 | 31 | |
| Ethyl 4-(2-m-chlorobenzoylethyl)-1-piperazinecarboxylate hydrochloride | 62 | 31 | 62 | | 31 | | 8 | 8 | | 62 | 8 | |
| Ethyl 4-[2-(p-bromobenzoyl)ethyl]-1-piperazinecarboxylate hydrochloride | 125 | 125 | 125 | 250 | 125 | 125 | 125 | 16 | 125 | 125 | 125 | |
| Ethyl 4-[2-(2,4,6-trimethylbenzoyl)ethyl]-1-piperazinecarboxylate hydrochloride | 125 | 125 | 125 | 125 | 125 | 125 | 125 | 125 | 125 | 125 | 125 | 125 |
| Ethyl 4-(2-m-bromobenzoylethyl)-1-piperazinecarboxylate hydrochloride | 125 | 125 | 125 | | 125 | 250 | 125 | 31 | 125 | 125 | 125 | |

TABLE I.—MINIMAL INHIBITORY CONCENTRATIONS IN MICROGRAMS PER MILLILITER OF MEDIUM—Continued

| | Candida Albicans Bergen Strain E-3 | Candida mycoderma ATCC 9888 | Saccharomyces cerevisiae ATCC 4100 | Mucor remannianus M-143 | Fusarium episphaeria F-106 | Hormodendrum cladosporoides Z-516 | Trichophyton Mentagrophytes E-11 | Microsporum gypseum E-28 | Penicillium digitatum P-308B | Memnoniella eschinata Z-583 | Chaetomium globosum ZMC-6694 (H-71) | Aspergillus fumigatus S-246 |
|---|---|---|---|---|---|---|---|---|---|---|---|---|
| Ethyl 4-[2-(2,5-dimethoxybenzoyl)ethyl]-1-piperazinecarboxylate hydrochloride | 250 | 125 | 125 | | 125 | 125 | 125 | 16p | 125 | 125 | 125 | |
| Ethyl 4-[2-(2,4,-dimethylbenzoyl)ethyl]-1-piperazinecarboxylate hydrochloride | 250 | 125 | 31 | | 125 | 125 | 125 | 8p | 125 | 125 | 125 | |
| Ethyl 4-[2-(2,5-dimethylbenzoyl)ethyl]-1-piperazinecarboxylate hydrochloride | 250 | 250 | 125 | 250 | 125 | 250 | 125 | 31 2p | 125 | 125 | 125 | |
| Ethyl 4-[2-(2,4-dimethylbenzoyl)ethyl]-1-piperazinecarboxylate hydrochloride | 125 | 250 | 125 | | 125 | 250 | 125 | 8 | 125 | 125 | 125 | |
| Ethyl 4-[2-(p-fluorobenzoyl)ethyl]-1-piperazinecarboxylate hydrochloride | 62p 125 | 125 | 125 | 125 | 62 | 125p 250 | 15.5p 31 | 31p 62 | 125 | 250 | 62 | 250 |
| Ethyl 4-[2-(p-methylbenzoyl)ethyl]-1-piperazinecarboxylate hydrochloride | 62 | 62 | 31 | 250 | 31 | 250 | 2 | 2 | 250 | 62 | 62 31p | |
| Ethyl 4-(2-m-nitrobenzoylethyl)-1-piperazinecarboxylate hydrochloride | 31p 62 | 62 | 31 | 125 | 31 | 62 62p | 15.5 | 15.5 | 62 | 125 | 62 | 125 125p |
| Ethyl 4-(2-p-nitrobenzoylethyl)-1-piperazinecarboxylate hydrochloride | 31 | 31 | 31 | 125 | 31 | 125 62p | 7.8 | 15.5 31p | 125 | 125 | 31 | 250 |
| Ethyl 4-(2-o-chlorobenzoylethyl)-1-piperazinecarboxylate hydrochloride | 62 62p | 31 62p | 31 | 125 | 31 | 125 | 15.5 | 15.5 | 62 62p | 125 62p | 62 8p | 250 |
| Ethyl 4-[2(p-hydroxybenzoyl)ethyl]-1-piperazinecarboxylate hydrochloride | 125 | 125 | 31 | 250 | 31 | 250 62p | 4 | 4 2p | 125 | 125 31p | 15 2p | 250 |
| Ethyl 4-[2(p-propoxybenzoyl)ethyl]-1-piperazinecarboxylate hydrochloride | 15 | 15 | 15 | 125 | 15 | 125 | 4 2p | 4 2p | 62 62p | 62 | 4 4p | 250 |
| Ethyl 4-[2(2,4-dimethoxybenzoyl)ethyl]-1-piperazinecarboxylate hydrochloride | 62 | 62 | 62 | 62 | 31 | 250 | 4 | 4 | 62 | 125 | 8 | |
| Ethyl 4-[2-(3,4-dichlorobenzoyl)ethyl]-1-piperazinecarboxylate hydrochloride | 15p 31 | 15p 62 | 15p 62 | 125p 250 | 8 | 62p 125 | 1p 2 | 4p 8 | 125 | 62 | 2 | 250 |
| Ethyl 4-[2(p-acetamidobenzoyl)ethyl]-1-piperazinecarboxylate hydrochloride | 250 | 250 | 125 125p | | 62 | | 15 0.5p | 31 | | 250 | 62 | |
| Ethyl 4-[2-(m-acetamidobenzoyl)ethyl]-1-piperazinecarboxylate hydrochloride | | 250 | 250 | 250 | 250 | | 1 | 31 | | | | |
| Ethyl 4-[2(p-dodecyloxybenzoyl)ethyl]-1-piperazinecarboxylate hydrochloride | | | | | | | 125p 4p | 125p | | | | |
| Ethyl 4-[2-(α,α,α-trifluoro-p-toluoyl)-ethyl]-1-piperazinecarboxylate hydrochloride | 250 | 125 125p | 125 125p | 250 | 250 125p | | 8 8p | 62 15p | 250 | 250 | | |
| Ethyl 4-[2-(α,α,α-trifluoro-m-toluoyl)-ethyl]-1-piperazinecarboxylate hydrochloride | 250p 62p | 250 | 250 | 250 | 250 | | 31 | 31 2p | 250 | | 31 31p | |
| Ethyl 4-(2-vanilloylethyl)-1-piperazinecarboxylate hydrochloride | 125 | 15 | 125 | 125 | 31 | 125p 250 | 1 | 4 | 62 | 62 | 8p 15 | 125 |
| Ethyl 4-[2-(2-thenoyl)ethyl]-1-piperazinecarboxylate hydrochloride | 125 | 31 | 31 | 250 | 250 | 125 | 125 | 16 | 26p | 125 | 250 | 250 |
| Ethyl 4-[2-(5-chloro-2-thenoyl)ethyl]-1-piperazinecarboxylate hydrochloride | 125 62p | 62 | 62 | 62 | 250 | 250 125p | 125 15.5p | 16 | 125 62p | 125 125p | 250 15.5p | 250 |
| Ethyl 4-[2-(9-phenanthroyl)ethyl]-1-piperazinecarboxylate hydrochloride | 125 | 125 31p | 250 | 62 62p | 125 | 250 | 31 3.9p | 31 7.8p | 125 | 250 62p | 31 15.5p | 250p 62p |
| Ethyl 4-[2-(2-naphthoyl)ethyl]-1-piperazinecarboxylate hydrochloride | 31 15.5p | 62 15.5p | 62 | 125 | 31 | 125 62p | 15.5 | 15.5 15.5p | 125 15.5p | 62p | 31 | 125 |
| Ethyl 4-[2-(1-naphthoyl)ethyl]-1-piperazinecarboxylate hydrochloride | 31 15.5p | 31 | 15.5 | 62 | 15.5 | 125 62p | 15.5 | 31 3.9p | 31 31p | 125 | 31 7.8p | 250 |
| Benzyl 4-(2-p-toluoylethyl)-1-piperazinecarboxylate hydrochloride | 31 | 15.5 4p | 15.5 4p | 125 | 15.5 | 125 62p | 2 | 7.8 | 62 | 62 | 15.5 | 125 |
| Benzyl 4-(2-p-ethoxybenzoyl)-1-piperazinecarboxylate hydrochloride | 15 | 8 | 8 | 125 | 8 | 125 | 2 | 2 | 31 | 31 | 4 | 250 |

EXAMPLE 1

The general method for the preparation of the compounds listed in Table I is as follows:

A mixture of 0.11 mole of the appropriate arylmethylketone or heterocyclemethylketone, 0.10 mole of formaldehyde (37% aqueous solution), 0.10 mole of ethyl 1-piperazinecarboxylate hydrochloride, and sufficient ethanol to effect complete solution at room temperature, is refluxed for 6 hours. An additional 1.0 ml. of the 37% aqueous formaldehyde solution is added at the one hour and the three hour intervals. The reaction mixture is cooled to 0° to −10° C., the precipitate collected, washed with acetone, and dried. If no precipitate forms upon cooling, the mixture is concentrated to one-half of its original volume, and then cooled to −10° C. Purification, if required, is effected by recrystallization from ethanol, methanol, or other lower alkanol.

EXAMPLE 2

The benzyl esters of this invention (i.e., those wherein $R_2$ is benzyl), such as benzyl 4-(2-p-toluoylethyl)-1-piperazinecarboxylate hydrochloride, melting at 180° C., and benzyl 4-[2-(p-ethoxybenzoyl)ethyl]-1-piperazine carboxylate hydrochloride, melting at 176–177° C., are prepared by the same method, using benzyl 1-piperazinecarboxylate instead of ethyl 1-piperazinecarboxylate described in Example 1.

EXAMPLE 3

*Preparation of benzyl 4-(2-p-toluoylethyl)-1-piperazinecarboxylate hydrochloride*

Employing the general procedure for the preparation of the compounds of Table I, 61.2 g. (0.46 mole) of 4'-methylacetophenone, 36 g. (0.44 mole) of 37% aqueous formaldehyde, 102.2 g. (0.40 mol.) of benzyl 1-piperazinecarboxylate, hydrochloride, and 200 ml. of ethanol gave 114 g. (62%) of the title compound, melting point 180° C.

Other compounds of this invention may be prepared by the same method described hereinabove. The ethyl esters of this invention (i.e., those in which $R_2$ is ethyl) have the following properties summarized in Table II.

TABLE II

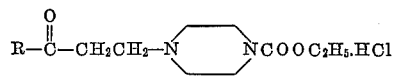

| R | Yield | | M.P ° C. (occ.) | Carbon | | Hydrogen | | Nitrogen | | Chlorine | |
|---|---|---|---|---|---|---|---|---|---|---|---|
| | g. | Percent | | Calcd. | Fd. | Calcd. | Fd. | Calcd. | Fd. | Calcd. | Fd. |
| 4-chlorophenyl | 16.7 | 46 | 178–85 | 53.22 | 53.33 | 6.14 | 6.41 | 7.76 | 7.77 | 19.63 | 19.63 |
| 4-methoxyphenyl | 24.6 | 69 | 187–7.5 | 57.22 | 57.31 | 7.06 | 7.39 | 7.84 | 7.88 | 9.93 | 10.20 |
| 4-ethoxyphenyl | 13.7 | 37 | 178.5–9 | 58.28 | 58.57 | 7.34 | 7.19 | 7.55 | 7.59 | 9.56 | 9.33 |
| 4-biphenyl | 15.8 | 39 | 199–200 | 65.58 | 65.39 | 6.75 | 6.87 | 6.95 | 6.90 | 8.80 | 8.80 |
| 3-chlorophenyl | 13.8 | 38 | 166–7 | 53.22 | 52.85 | 6.14 | 6.25 | 7.76 | 7.80 | 19.63 | 19.83 |
| 2-thienyl | 20.4 | 61 | 174–5 | 50.50 | 50.16 | 6.36 | 6.39 | 8.41 | 8.43 | 10.65 | 10.76 |
| 4-bromophenyl | 16.6 | 41 | 185–5.5 | 47.36 | 47.59 | 5.47 | 5.44 | 6.91 | 6.73 | 8.74 | 8.68 |
| Mesityl | 10.7 | 29 | 159.5–60.5 | 61.82 | 61.73 | 7.92 | 7.75 | 7.59 | 7.48 | 9.61 | 9.79 |
| 5-chloro-2-thienyl | 12.8 | 35 | 174–5 | 45.78 | 46.09 | 5.49 | 5.61 | 7.63 | 7.37 | 19.31 | 19.51 |
| 3-bromophenyl | 19.3 | 48 | 179–80.5 | 47.36 | 47.58 | 5.47 | 5.57 | 6.91 | 6.62 | 8.74 | 8.45 |
| 2,5-dimethoxyphenyl | 25.7 | 66 | 151–2.5 | 55.88 | 55.83 | 7.03 | 6.92 | 7.24 | 7.47 | 9.16 | 9.39 |
| 2,4-xylyl | 14.0 | 40 | 165–6 | 60.92 | 60.86 | 7.67 | 7.75 | 7.89 | 7.87 | 9.99 | 10.26 |
| 2,5-xylyl | 17.6 | 50 | 165–5 | 60.92 | 60.44 | 7.67 | 7.86 | 7.89 | 7.78 | 9.99 | 10.12 |
| 3,4-xylyl | 19.0 | 54 | 180–1 | 60.92 | 61.03 | 7.67 | 7.92 | 7.89 | 7.67 | 9.99 | 10.10 |
| 9-phenanthryl | 16.2 | 38 | 193–4 | 67.51 | 67.29 | 6.45 | 6.56 | 6.32 | 6.32 | 8.30 | 8.29 |
| 4-fluorophenyl | 23.4 | 68 | 177–8 | 55.74 | 55.80 | 6.43 | 6.72 | 8.12 | 7.97 | 10.28 | 10.49 |
| 2-naphthyl | 32.2 | 85 | 179–80 | 63.71 | 63.87 | 6.68 | 6.76 | 7.43 | 7.11 | 9.41 | 9.20 |
| 3-nitrophenyl | 16 | 42 | 197–8 | 51.69 | 51.61 | 5.96 | 6.08 | 11.31 | 11.07 | 9.54 | 9.54 |
| 4-nitrophenyl | 15 | 40 | 190.5–1 | 51.69 | 52.07 | 5.96 | 6.25 | 11.31 | 11.11 | 9.54 | 9.52 |
| 2-chlorophenyl | 10 | 56 | 148–9 | 53.22 | 53.24 | 6.14 | 6.17 | 7.76 | 7.70 | 19.63 | 19.67 |
| 1-naphthyl | 70 | 53 | 186–9 | 63.71 | 63.35 | 6.68 | 6.94 | 7.43 | 7.62 | 9.41 | 9.21 |
| 3,4-dichlorophenyl | 10 | 25 | 192–3 | 48.56 | 48.64 | 5.35 | 5.25 | 7.07 | 6.86 | 26.87 | 26.80 |
| 2,4-dimethoxyphenyl | 35.5 | 92 | 158–9 | 55.88 | 55.99 | 7.03 | 7.04 | 7.24 | 7.04 | 9.16 | 8.98 |
| 3,4,5-trimethoxyphenyl | 21.5 | 52 | 182–3 | 54.74 | 54.25 | 7.01 | 6.69 | 6.72 | 6.62 | 8.50 | 8.49 |
| 4-hydroxyphenyl | 7.3 | 22 | 193–4 | 56.37 | 56.15 | 6.80 | 6.86 | 8.22 | 7.85 | 10.40 | 10.25 |
| 4-n-propoxyphenyl | 119 | 53 | 183–4 | 59.44 | 58.87 | 7.61 | 7.28 | 7.30 | 6.88 | 9.23 | 9.01 |
| α,α,α,-Trifluoro-p-tolyl | 10 | 25 | 189.5–90.5 | 51.71 | 51.80 | 5.61 | 5.83 | 7.09 | 7.24 | 8.98 | 9.01 |
| α,α,α,-Trifluoro-m-tolyl | 10 | 25 | 176.5–8 | 51.71 | 51.32 | 5.61 | 5.69 | 7.09 | 7.08 | 8.98 | 9.00 |
| 3-methoxy-4-hydroxyphenyl | 15 | 40 | 193.5–4 | 54.76 | 54.65 | 6.76 | 6.78 | 7.51 | 7.45 | 9.51 | 9.54 |

We claim:
1. A compound of the formula:

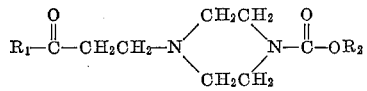

wherein R, is selected from the group consisting of lower alkyl phenyl, hydroxy phenyl, lower alkoxy phenyl, halophenyl, nitrophenyl, aminophenyl, loweralkanoylaminophenyl or trifluoromethylphenyl, naphthyl, phenanthryl, biphenylyl, thienyl, pyridyl and furyl, $R_2$ is selected from the group consisting of lower alkyl and phenyl(lower)alkyl.

2. The compound ethyl 4-(2-p-chlorobenzylethyl)-1-piperazinecarboxylate hydrochloride.

3. The compound ethyl 4-(2-p-anisoylethyl)-1-piperazinecarboxylate hydrochloride.

4. The compound ethyl 4-(2-p-ethoxybenzoyl)-1-piperazinecarboxylate hydrochloride.

5. The compound ethyl 4-[2-(4-biphenylylcarbonyl)-ethyl]-1-piperazinecarboxylate hydrochloride.

6. The compound ethyl 4-(2-m-chlorobenzoylethyl)-1-piperazinecarboxylate hydrochloride.

7. The compound ethyl 4-[2-(p-bromobenzoyl)ethyl]-1-piperazinecarboxylate hydrochloride.

8. The compound 4-[2-(2,4,6-trimethylbenzoyl)ethyl]-1-piperazinecarboxylate hydrochloride.

9. The compound ethyl 4-(2-m-bromobenzoylethyl)-1-piperazine carboxylate hydrochloride.

10. The compound ethyl-4-[2-(3,4-dimethylbenzoyl)-ethyl]-1-piperazinecarboxylate hydrochloride.

11. The compound ethyl 4-[2-(p-fluorobenzoyl)ethyl]-1-piperazinecarboxylate hydrochloride.

12. The compound ethyl 4-(2-benzoylethyl)-1-piperazinecarboxylate hydrochloride.

13. The compound ethyl 4-[2-(p-methylbenzoyl)ethyl]-1-piperazinecarboxylate hydrochloride.

14. The compound ethyl 4-(2-m-nitrobenzoylethyl)-1-piperazinecarboxylate hydrochloride.

15. The compound ethyl 4-(2-p-nitrobenboylethyl)-1-piperazinecarboxylate hydrochloride.

16. The compound ethyl 4-(2-o-chlorobenzoylethyl)-1-piperazinecarboxylate hydrochloride.

17. The compound ethyl 4-[2(p-propoxybenzoyl)ethyl]-1-piperazinecarboxylate hydrochloride.

18. The compound ethyl 4-[2(2,4-dimethoxybenzoyl)-ethyl]-1-piperazinecarboxylate hydrochloride.

19. The compound ethyl 4-[2-(3,4-dichlorobenzoyl)-ethyl]-1-piperazinecarboxylate hydrochloride.

References Cited by the Examiner

Jacobs et al., Journ. Organic Chemistry, vol. 11, pp. 218–222, 1946.

ALEX MAZEL, *Primary Examiner.*

HENRY R. JILES, *Examiner.*

J. W. ADAMS, *Assistant Examiner.*